United States Patent [19]

Waldmann

[11] Patent Number: 5,294,352

[45] Date of Patent: Mar. 15, 1994

[54] COMPOSITIONS FOR THE DETACKIFICATION OF PAINT SPRAY BOOTH WATER AND WASTE WATER

[76] Inventor: John J. Waldmann, 2129 Knickerbocker Dr., Charlotte, N.C. 28212

[21] Appl. No.: 47,624

[22] Filed: Apr. 15, 1993

Related U.S. Application Data

[63] Continuation of Ser. No. 763,880, Sep. 20, 1991, abandoned, which is a continuation of Ser. No. 409,396, Sep. 19, 1989, abandoned, which is a continuation-in-part of Ser. No. 96,681, Sep. 15, 1987, abandoned, and a continuation-in-part of Ser. No. 749,343, Jun. 27, 1985, Pat. No. 4,891,422.

[51] Int. Cl.⁵ ............................................. B01D 21/01
[52] U.S. Cl. ........................................ 210/725; 528/9;
528/230; 528/245; 528/246; 528/247; 528/248;
528/254; 528/256; 528/257; 528/258; 528/264;
528/266; 528/268; 528/423; 524/81; 524/174;
524/176; 524/204; 524/270; 524/271; 524/401;
524/432; 524/433; 524/437; 524/443; 524/444;
524/183; 524/188; 524/261; 525/54.2;
525/54.42; 525/54.5; 525/63; 525/73; 525/76;
525/88; 525/248; 525/249; 525/259; 525/294;
525/473; 525/472; 525/509; 525/515; 525/518;
210/696; 210/698; 210/701; 210/720; 210/723;
210/728; 210/732; 210/733; 210/736; 134/38

[58] Field of Search ............... 528/9, 230, 245, 246,
528/247, 248, 254, 256, 257, 258, 264, 266, 268,
423; 524/401, 432, 433, 437, 443, 444, 81, 174,
176, 204, 270, 271, 183, 188, 261; 525/54.2,
54.42, 54.5, 63, 78, 76, 88, 248, 249, 259, 294,
473, 472, 509, 515, 518; 210/696, 698, 721, 720,
723, 725, 728, 732, 733, 736; 134/38

[56] References Cited

U.S. PATENT DOCUMENTS

| | | | |
|---|---|---|---|
| 3,645,841 | 2/1972 | Cabestany et al. | 162/166 |
| 3,990,986 | 11/1976 | Gavel et al. | 252/315 |
| 4,067,806 | 1/1978 | Mauceri | 210/52 |
| 4,182,839 | 1/1980 | Tesson | 528/254 |
| 4,401,574 | 8/1983 | Farrington et al. | 210/728 |
| 4,637,824 | 1/1987 | Pominville | 55/85 |
| 4,891,422 | 1/1990 | Waldman | 528/422 |
| 4,902,779 | 2/1990 | Waldmann | 528/422 |
| 5,116,514 | 5/1992 | Bhattacharyya | 210/712 |
| 5,215,668 | 6/1993 | Bhattacharyya | 210/712 |

Primary Examiner—Samuel A. Acquah
Attorney, Agent, or Firm—Isaac Angres

[57] ABSTRACT

A composition for the detackification and clarification of acid and alkaline paint and lacquer waste waters and paint spray booth wastes, comprising:
an inorganic-organic and/or organic adduct alloy polymer composition having the formula:

$$A \cdot B^+ \cdot D^+$$

wherein:

$$A = [(SiO_2/Me'_2O)_u Me^{II}_m Me_m^{III}(OH)_p(SO_4)_y {}^{(Aci)}(2m+3n)-p-2y]_r$$

where
r = 1 to 98% bw;
u = 0 to 10% bw;

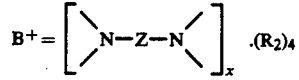

where:
x = 0 to 98% bw; Z is a divalent substituted or unsubstituted aliphatic, cycloaliphatic, heterocyclic or aromatic radical $$D^+ (PQAM)_w$$

where
w = 2 to 98% b.w. of polyquaternized polymer (PQAM)
$Me_m^{II}$ is selected from the divalent cationic group comprising: Mg, Zn, Ca, and Fe²⁺
m = 0 to 5
$Me_n^{III}$ is a tri-or more valent metal selected from the group comprising: Fe, Al, and Al-Zn complexes;

(Abstract continued on next page.)

$n = 1$ to $20$

Aci is selected from the monovalent anionic group comprising $Cl^-$, $Br^-$, $I^-$, $NO_3^-$, $H_2PO_4^-$, $CH_3COO^-$, $OH^-$ or a mixture of two or more of the foregoing, but preferably Aci is $Cl^-$, $NO_3^-$, $CH_3COO^-$, or $H_2PO_4^-$;

MeI = Na, K, Li, Cs $p = 0$ to $75$ $y = 0$ to $15$

The method of manufacturing such compositions is also disclosed.

20 Claims, No Drawings

COMPOSITIONS FOR THE DETACKIFICATION OF PAINT SPRAY BOOTH WATER AND WASTE WATER

Cross Reference to Related Application

This application is a continuation of application Ser. No. 07/763,880 filed Sep. 20, 1991, now abandoned which is a continuation of Ser. No. 07/409,396 filed Sep. 19, 1989 now abandoned, which is a continuation-in-part of abandoned Ser. No. 07/096,681 filed Sep. 15, 1987 now abandoned which is a continuation-in-part of U.S. Ser. No. 06/749,343 filed Jun. 27, 1985 now U.S. Pat. No. 4,891,422.

BACKGROUND OF THE INVENTION

Industrial waste water as well water-borne waste and paints derived from industrial processes such as electrophoretic and spray-booth painting can cause serious pollution problems. Water-born paints, and waste water when discharged as aqueous carrier with paint or lacquer residues, increase substantially the chemical oxygen demand (COD). Such paint and lacquer deteriorate by ageing or chemical modification, become sticky or hard, resulting in pipe and equipment blockage which are extremely difficult to clear.

In addition to the prior art disclosed in U.S. patent application Ser. No. 842,515, filed on Mar. 21, 1986, the following prior art patents are related to the subject matter of this application:

U.S. Pat. No. 4,067,806 of Frank A. Mauceri, discloses a process of detackification of paint and spray booth lacquer by using amphoteric salts (like zinc chloride etc.) and a terpolymer-"graft"-on diallyldimethylammonium halide, N-vinylpyrrolidone and acrylamide. The compositions have tremendous disadvantage by using amphoteric salts like $ZnCl_2$, which will form zinc hydroxide only at high pH of 10 to 10.5. Below and above this pH range, the zinc hydroxide is soluble again, so the floc forms. On the other hand, the zinc hydroxide is very fluffy and unstable, and absorbs much water which makes the products very unsecure in this kind of application. The waste water and the sludges are alkaline and can not be discharged without further treatment, which makes such processes uneconomical. Further, under the conditions described in the patent, the amphoteric salt ($ZnCl_2$) can easily be transformed into inactive anion like $(ZnCl_3)^-$ by the reaction:

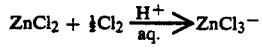

which decreases the efficiency to treat and/or kill the anodic and/or cathodic paints, lacquer, etc.

U.S. Pat. No. 3,990,986 of Gabel, et al, like Mauceri, teaches detackification of the paint and lacquer by using amphoteric salts (like $ZnCl_2$) or a blend with alkanolamines and/or aliphatic amino alcohols. This patent presents the same negative aspects as Mauceri. Note also that the test conditions of detackification use an insufficient amount of paint (0.5 cc/500 mls of water) for a fair test. The product selected, such as polyalkylene oxide with molecular weight (Mw) of 200 has low Tg (glass transition temperature) which makes the reaction hydrophilic, resulting in very unsecure floc, and the paint may be only partially killed.

U.S. Pat. No. 4,401,574 of Farrington, et al, uses polyaluminum chloride (PAC) in paint waste water, such as polyvinylacetate latex based paint or vinyl-acrylic paint. The (PAC) alone or mixed with regular aluminum and/or iron salts (chloride, sulfate) are totally ineffective on air-borne paint and lacquer waste water treatment. Even in regular paint waste water, the water clarity (35 NTU) is still hazy.

U.S. Pat. No. 4,182,839 of Tesson discloses the process of manufacturing cationic resin soluble in water, based on melamine formaldehyde-alkyl and/or alkanolamine-hydrochloric acid. The products are used in the paper industry, to develop resistance of paper to humid conditions.

U.S. Pat. No. 4,504,396 of Harpel, et al. discloses compositions based on a hectorite clay, an antifoaming agent, aluminum oxide and montmorillonite clay as a paint detackifier agent.

Electrophoretic paints consist of an organic substrate on which ionic charges have been introduced. Today's market can offer anodic electropaints or a cathodic formulation. For more than twenty years, the method of treatment has been to add a chemical coagulant (either ferric or aluminum salts) in a controlled pH environment to form a hydrous oxide floc onto which that paint can be adsorbed. The anodic paints become sticky if they encounter acid conditions and cathodic paints become sticky in alkaline conditions. Application of solvent-based paints by spraying, followed by a hardening stage is extensively practiced for motor car body finishes over the electropaint primer. The spraying is carried out in a booth with exhaust system to extract surplus air-borne paints. Any removed material passes through a curtain of recirculating water, which will absorb paint and solvent, and which has to be removed before the waste water is recirculated.

The most common paints used are classified into two groups:

a. Spray-booth paints such as thermosetting acrylic clearcoat, thermosetting acrylic enamel, thermoplastic acrylic lacquer and stoving alkyd.

b. Electophoretic paints such as acrylic based anodic, epoxy-based cathodic and polybutadiene based anodic.

Other paint-varnish systems which may be used are:
1. Epoxy, such as pre-polymerized epoxy resin, amide-epoxy (crosslinked copolymers).
2. Styrenated alkyd
3. Drying oils
4. Phenolic resin
5. Urea alkyd
7. Urea melamine
7. Silicone The treatment system commonly used is controlled additions of coagulants with simultaneous pH control which are removed by air flotation, electroflotation or sedimentation, slurryholding and filter press. In the case of air flotation, full chemical coagulant with good performance is still to be achieved. the regular ferric or aluminum sulfate, though largely unsuccessful for coagulation processes, are used as paint "killer". The industrial waste water and water-borne paints treated with the inorganic-organic and/or organic alloy polymer adducts have a high impact on coagulation processes. These act as primary coagulants which under neutralization processes (preferable "hydrophobe" compositions) will floc and kill the paint. Good performance was produced with an operating pH of 6.0 to 9.0 for anodic and cathodic paint which gives high supernatant clarity and high settling and/or dewatering rates. As pH can be used any reagents, or alkaline inorganic and/or organic matter but preferable are the hydrophobe alkaline agents. For the preparation of "hydrophobe" alkaline material, the following can be used:

a. Any inorganic and/or organic alkaline matter such as NaOH, KOH, Ca(OH), sodium aluminate, potassium aluminate, sodium zincate, sodium silicate and/or metasilicate, sodium borate, alkyl amines, alkanol amines or mixture of these in combination with "hydrophobe" materials.

b. (Co)polymers, surfactants (preferably nonionics and/or anionics and/or mixture of these from 0.5%b.w. - 95.5%b.w. -0.5%b.w.). The most preferable hydrophobe products are the (co) polymers such as cationic polyamine, or vinyl latex type as ethylenicaly, styrene latex, styrene-divinylbenzene latex, styrene butadiene (modified) latex, styrene acrylates or acrylic latex, acrylates or natural polymers type.

c. Hydroxy alkyl(poly)carboxylate salts or acids such as sodium gluconate, sodium gluco heptonate, modified natural (co)polymers salts, sodium rosinates, sodium glucosides or other cation combinations, clay and bentonite modified inorganic or organic type including cationic types.

d. Other products used can be in any forms as inorganic/or organic alkaline stripper agents including halogenated types and/or in combination with products (a), (b) and/or (c).

For air and/or electroflotation, NaOH is the most commonly used, producing as well as hydrophobe agents in some cases, less dense and easily floated flocs. For anodic paint treatment, alkali dosage can be used before the coagulation addition, therefore the final pH is approached from the high pH end.

Polyelectrolyte selection is very important too. These must have very high molecular weight (Mw). In the case of waterborne paint waste water, a dosage of less than 1.0 ppm often improved supernatant clarity and fast settlement. Higher concentrations may tend to produce bulky, open-textured flocs.

SUMMARY OF THE INVENTION

The treatment with inorganic-organic alloy adduct polymers and/or organic alloy-adduct polymers involved denaturation of the surface or dispersed matter and of semidispersed paint globules in combination with hydrophobic alkaline or alkaline matter. This treatment is sufficient to render the paint globules relatively "nonsticky" and it allows them to be skimmed from the surface of the treatment solution into filter bags. The sludges produced by the selected products have low water content, and dewater much faster than any combination used in the prior art. The clarified effluent can then be re-cycled to the spray-booth.

The polyelectrolyte is added (if required) in a uniform manner and at one or several distribution points by gentle mixing. Because the water has high electrolyte content, most of the time the flocculation process does not occur completely, therefore several feeding points should be selected. In many cases, it may be noticed that partial flocculation may occur followed by converting into thickening material which may produce very gummy and sticky floc.

On the other hand, when calcium, magnesium hydroxide is used, resulting floc is more compact, and sludge is faster-setting. NaOH is the choice for producing less dense and more easily floated flocs. It was found that by using $Al^{3+}$ or $Fe^{3+}$ (either as chloride or sulfate polychloride or polysulfate types) or as mixture anions, a regular coagulant can not produce satisfactory results at all. The floc formed is tacky, "unkilled", bulky, and produces turbid water. Most of the systems proposed today use very high pH, such as pH 10 to 14. U.S. Pat. No. 3,990,986 even suggests a dosage up to 100,000 ppm. Any system with such high pH treatment and amphoteric salts produces other problems which require additional treatment for sludges and waste water. The alkaline sludge can not be disposable or incinerated and the alkaline water and high suspended matter can not be discharged. In contrast with existing technologies, the organic-inorganic alloy polymers and/or organic alloy polymer compositions selected require much lower treatment dosage (5 to 7000 ppm), depending on the paint nature. If a mixture of paint characters are treated, the normal pH of 7 to 9 is suitable for effective treatment. The products are not corrosive, and the killed paint flocs can be easily handled by other plant operations.

For these products, the most useful are the quaternary ammonium polymers which can be prepared by:

1. Quaternization of a monomeric compound, e.g. a vinyl monomer or epoxide, and subsequent polymerization.
2. Quaternization of tertiary amine with halogenated polymer.
3. One-step spontaneous polymerization of unsaturated tertiary amine (e.g. vinyl pyridine) with alkylating agents.
4. Quaternization of polyamine with alkyl halide.
5. Polymerization of di(tertiary amine) and alkylene dichloride to form (poly)ionenes or polymerization of chloroalkyl tertiary amine to form (poly)ionenes.
6. Post reaction of polymer containing suitable reactive functional groups with quaternary ammonium compounds.

In the case of inorganic-organic adduct polymers which are multianions, they can display the monoactivity charges of (Cl—) or ($\frac{1}{2}SO_4^{2-}$) by multivalent metal anion system generating more active flocculants and/or coagulants. For instance, if an inorganic adduct polymer such as aluminum hydroxy sulfate is reacted with polydiallyldimethyl ammoniumchloride, the chlorine anionic (Cl—) will be displaced by the multianion, such as:

where the dissociation constant (Kd) is greater than association constant (Ka):

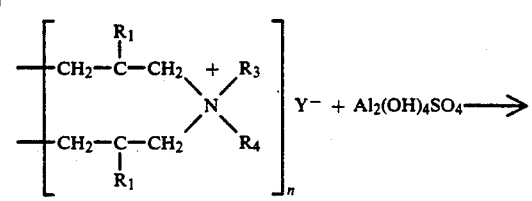

-continued

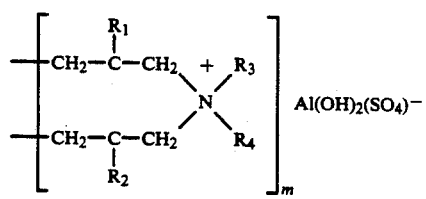

where $R_1$ and $R_2$ represent hydrogen, methyl and ethyl radicals, $R_3$ and $R_4$ each represent alkyl, alkoxyalkyl, hydroxyalkyl radicals having one to eight (1 to 8) carbon atoms, and (Y—) represents an anion and 2 complex anions, such as methosulfate, ethosulfate, chlorine, bromine and iodine.

The synthesis can be carried out from room temperature (RT) to 175° C. and from normal pressure to 0.2 to 25 Kg /cm². Some details of these preparations are described in U.S. patent application Ser. No. 842,515, filed in Mar. 21, 1986, which is incorporated herein by reference.

The invented products based on inorganic-organic polymer adduct alloys, inorganic-organic polymer adduct alloys-surfactants and/or humectants, or organic polymer adduct alloys-surfactants and/or humectants compositions are high performing, highly effective, products for any waste water treatment of waterborne waste including paints and lacquers. The inorganic-organic polymer adduct alloy can be produced in full yield having a viscosity less than 20,000 cps as water soluble with or without special wetting agents or surfactants, such as alcohols, hydroxy-alcohols, glycols, polyglycols, aprotic solvents like: dimethyl-sulfoxide, ketones, lactones, alkyl and alkyloxy phosphonate/or polyphosphonates (called humectants), salts such as sodium hydrogen sulfate, ammonium and sodium citrate which can vary from 0% to 45% by weight. The most suitable surfactants for this application are:

I Anionics
II Nonionics
III Cationics
IV Zwitterionics
V N-Lauryl sarcoside
VI Linear alkylbenzene sulfonate
VII Higher alkylbenzene sulfonate
VIII Linear sulfonate
IX Petroleum sulfonate
X N - Aryl -n-alkyllaurate
XI Parafin sulfonate (S A S)
XII L-Olefin sulfonates (A 0 S)
XIII Alkynaphthalene sulfonates
XV Sulfated linear alkyl alcohols
XVI Sulfated polyoxyethylenated straight chain alcohols
XVII Sulf(on)ated oils
XVIII Phosphoric and polyphosphoric acid, esters, polyoxyacids disubstituted phosphonates - in monomeric or polymeric forms
XIX Quaternary ammonium salts
XX Amine oxide
XXI Polyoyethylated long-chain amines and the quaternized products
XXII Polyoxyethylenated straight-chain alcohols, alcohol ethoxylates
Sulfated linear alkyl alcohols ethoxylated (EO)$_{1-60}$
XXIV Sulfated polyoxyethylenated straight-chain alcohols
XXV Sulf(on)ated oils and their blends
XXVI Phosphoric and polyphosphoric acid esters, di-substituted phosphonated of polyalkyloxyacids in a monomeric or polymeric forms
XXVII Quaternary ammmonium salts, N-alkyltrimethylammonium chloride, N,N-dialkyldimthylammonium chloride benzyl(alkyl)$_{1-3}$ ammonium chloride (1-3=mono, di and tri)
XXVIII Amine oxide copolymers
XXIX Polyoxyethylated long-chain amines and quaternized products
XXX Polyoxyethylenated polyoxypropylene glycol
XXXI Polyoxyethylenated mercaptans
XXXII Quaternary ammonium benzosulfamides
XXXIII Ethoxylate of oligosaccharides
XXXIV Mixture of anionics-nonionic from 0.5-95% bw, or cationics-nonionic from 0.505-95% bw, and/or anionics, cationics or nonionic from 0.5% bw to 99.5% bw.

The products are stable, low cost, and contribute greatly to eliminating the water and air pollution caused by the paint, auto, chemical and furniture industries.

DETAILED DESCRIPTION

The invented chemical compositions are inorganic-organic alloy polymer adduct compositions and/or organic alloy polymer adducts compositions for water-borne waste and lacquer paint treatment, having the formula:

(A)

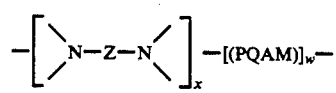

as described; provided that at least one of A, B+, D+ is positive.

Component A

The novel (co)polymer alloy of inorganic polymers (A) is defined by any of the following general formulas, I(a) through I(g):

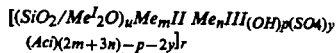   I(a)

wherein:

($SiO_2/Me^IO_2$)$_u$ = 1.5 to 3.5 ratio, u=0 to 10% and $Me^I$=Na,K,L,Cs $SiO_2$=sodium silicate, sodium metasilicate or mixture thereof:

r=0 to 98%; p=0 to 75; y=0 to 15

$Me^{II}$ is a divalent cation selected from the group comprising: Mg, Zn, Ca, Fe$_{2+}$ and m=0 to 5

$Me_n^{III}$ is a tri- or more valent metal, preferably Fe,Al, or Al-Zr complexes; and n=1 to 20

Aci is selected from monovalent anionic group comprising: (a) Cl—, (b) Br—, (c)I—, (d) NO$_3$—, (e) CH$_3$COO—, (f) H$_2$Po$_4$—,(g) OH$^-$ or (h) a mixture of two or more of the foregoing, but preferably Aci is Cl—.

These products may be prepared by a variety of processes as described in U.S. patent application Ser. No. 646,012, filed Aug. 31, 1984.

$Al_n(OH)_mX_{3n-m-2k}(SO_4)_k$     I(b)

wherein:

X is sodium or potassium aluminate, or $NO^-_3$, $Cl^-$ k, m, n are positive numbers.

$Al_{1-x}Fe_xIII\ Fe_yII\ (OH)_{3+2y-2(Hal)z}$     I(c)

wherein:

Hal=chlorine, bromine, iodine or a mixture thereof:

$(x+y)/(1-x)$=about 0.2 to 1.5.

$z<3+2y$, and $(3+2y-2)/(3+2y)$=about 0.24 to 0.67

$Al_n(OH)_x(SO_4)_y\ (H_2PO_4)_z$     I(d)

wherein:

the sum of $x+2y+2$ is 3;

m and x are positive integers;

y is 0 or a positive integer; and z is 0 or a positive integer.

$Me_n(OH)_mX_{3n-m}$     I(e)

wherein:

m, n are positive integers.

Me is a tri- or more valent metal, and

X is $Cl^-$, $CH_3COO^-$, or $NO_3.^-$ or $OH^-$

I (f): Regular salts of aluminum, iron, titanium, vanadium, chromium, antimony such as chloride, sulfates, phosphates, nitrates, acetates or mixture thereof, sodium and/or potassium silicate, magnesium and/or calcium silicate, aluminum magnesium silicate, sodium, metasiliicate, bentonite and/or cationic bentonite, organic cationic modified bentonite or mixture thereof Inorganic adduct polymer, as the term is used in this specification includes, without limitation:

1. Polyhydroxyaluminumchloride; $Al_4(OH)_9(Cl)_3$, or $Al_8(OH)_2(Cl)_3$, or $Al_{11}(OH)_{30}(Cl)_3$.

2. Hydroxyaluminumchloride: $Al_2(OH)_5Cl$ as Chlorhydrol TR-50, Astrigen TR-50

3. Polyhydroxyaluminumagnesiumchloride: $Al_3Mg(OH)_9(Cl)_2$;

4. Polyhydroxyaluminumcalciumchloride: $Al_7Ca_{0.0-4}(OH)_{17.01}(Cl)_4$;

5. Polyhydroxyaluminumagnesiumsulfate: $Al_4Mg(OH)_7(SO_4)3.5$;

6. Hydroxyaluminumsulfate: $Al_2(OH)_4SO_4$;

7. Polyaluminum sulfate PAS $Al_n(OH)_m(SO_4)_k$ n=1 to 6; m=0.5 to 14; k=0.3 to 3;

8. Polyhydroxyaluminumzincoxidechloride: $Al_3(OH)_3ZnO(OH)\ (Cl)_5$;

9. Polyhydroxyaluminum and/or magnesiumchlorosulfate: $Al_4(OH)_6(Cl)_4(SO_4)$ or $Al_3Mg(OH)_6(Cl)_3(SO_4)$;

10. Polyaluminumferric and/or ferrous chloride: $Al_2Fe_2(OH)_{3.32}(Cl)_{6.68}$ or $Al\ Fe_{0.25}IIFe_{0.25}III(OH)_{2.12}(Cl)$;

11. Polyaluminumchloride sulfate, and

12. Polyhydroxyaluminumchlorosilicate.

13. Aluminumzirconium (penta or tetra) chlorohydrate:

$Al_8Zr(OH)_{23}Cl_5$ or $Al_4Zr(OH)_{12}(Cl)_4$, etc.

Component B+

The B+ component has the formula

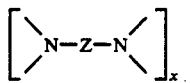

wherein Z is a divalent radical such as optionally organic substituted aliphatic; cycloaliphatic, heterocyclic or aromatic radical and x is from 0% to 95% by weight of total alloy compositions and the component (B+) of the composition is selected from polyalkylamines, polyetherpolyamines, polyethylenepolyamine(s), N-substituted ethyleneimines, polyquaternary compounds, 1, 3,-bisquaternaryammonium compounds, polyquaternaryalkylamine, polydiaziridinyl compounds, epihalohydrin with aqueous mixture of major amount of a secondary alkylamines and minor amount of a primary alkylamine, polyionenes, a quaternized of polyamine with alkylhalide and quaternized of tertiary amine with halogenated polymer, polyamine having a molecular weight from 200 to 500,000, and other high nitrogen content resinous or (co)polymers products such as guanidine, arylguanidine or cyanoguanidine, cyanoguanidine-melamine, melamine-formaldehyde, melamine-glyoxal, melamine-urea-formaldehyde, melamine-alkylamine-urea-formaldehyde, melamine formaldehyde-sulfite/or bisulfite salt, aminoazines which may be employed include aminotriazines, mixture of carbamides or amino-azines which may be used are: melamine, melam, ammeline, thioammeline and substituted ammeline, aminodiazines, mixture of carbamides or amino-azines which may be used include for example urea and melamines, melamine and cyanoguanidine, melamine and thioammeline; urea, melamine and 2,6-1,3-diazine and similar mixture; cyanamide, dicyandiamide, guanidine and alkylaryl, and aralkyl-substituted urea in condensation with aldehydes such as glyoxal but not limited. Aldehydes which may employed include formaldehyde or paraformaldehyde, acetaldehyde, benzaldehyde, butyraldehyde, furfurylaldehyde, glyoxal and mixtures of two or more aldehydes, such as formaldehyde and paraformaldehyde; formaldehyde and acetaldehyde and benzaldehyde; acetaldehyde and furfurylaldehyde formaldehyde, benzaldehyde and furfurylaldehyde and the like. Other aminoplast resin or aminoplast cationic resins which may be employed include melamine-formaldehyde or paraformaldehyde; melamine-formaldehyde-glyoxal melamine-urea or thiourea formaldehyde; melamine guanidine or cyanoguanidine-formaldehyde, melamine-glyoxal, melamine-urea-glyoxal; protonized or quaternized (by alkyl halide or dialkyl sulfate) or melamine-guanidine-/or cynoguanidine-formaldehyde protonized with mineral acid or organic acid such as hydrochloric, nitric, phosphoric, sulfuric, formic, acetic, glycolic, lactic, citric, propionic, butyric, oxalic, maleic, glutaric acids or a mixture of those. The melamine-glyoxal-sulfuric acid, or sulfuric-hydrochloric acid mixture, hydrochloric-formic acid mixture are unknown resins The protonized resins that may be employed include the following molarity:

| | |
|---|---|
| Melamine | 0.15 to 2.05 Moles |
| (Cyano) guanidine | 0.0 to 3.33 Moles |
| Formaldehyde | 0.0 to 15.0 Moles |
| Polyamine/or aliphatic amine, alkanolamine, N-alkyl/or N-hydroxy alkyl amine | 0.0 to 5.0 Moles |

| -continued | |
|---|---|
| Glyoxal | 0.5 to 5.0 Moles |
| Mineral acids and/or organic acid | 0.0 to 5.0 Moles |
| Quaternization agents as alkyl halide, dialkylsulfates, halo benzyl or arylsulfonic acid | 0.0 to 3.34 Moles |
| Organic acids | 0.0 to 5.0 Moles |

Other aminoplast resins which may be employed are:
a. Polyamine-modified urea-formaldehyde resins and
b. Melamine-formaldehyde resins,
c. Any suitable polyamine or polyarylamide modifier can be used in the modified urea-formaldehyde resins such as, without limit: cyanoguanidine-diethylene triamine-melamine; reaction product of about one (1) Mole cyano guanidine, about three (3) Moles of formaldehyde and from about 0.5 Mole to about one (1) Mole of urea, per mole of said cyanoguanidine and/or the reaction product of about 0.9 Mole of cyanoguanidine, about 0.1 Mole of melamine, about three Moles of formaldehyde and from about 0.5 Mole to about one Mole of urea per Mole of said cyanoguanidine and melamine produced and the mixture of said resins one part to about nine (9) parts of polyamine and/or polyacrylamine, and/or one part by weight of said polyarylamine and about two (2) to nine (9) parts of weight of said aminoplast resins and/or cationic aminoplast resins.

The inorganic-organic alloys adduct or organic alloy adducts (co)polymers which may be employed described above in this application are also suitable polyamine or polyacrylamide or cationic, anionic, nonionic that can vary from 2 to fifty (50%) percent by weight in combination, for instance with melamine-formaldehyde; melamine-formaldehyde-glyoxal; melamine-formaldehyde, alkyl ether melamine-formaldehyde or alkyl ether melamine-formaldehyde- inorganic or organic acids protonized, melamine-urea-formaldehyde inorganic or organic acids protonized, methylol-amino-epihalohydrin resinous products, or a mixture thereof.

Component D+ w is from 0% to 98% by weight (bw) and preferably 2% to 50% bw and most preferably 2% to 10% bs of the total alloy composition, and D+ is selected from group comprising polyacrylamide or copolymer of acrylamide having a quaternary ammonium group or tertiary ammonium salt group; the cationic (co)polyacrylamide may have a ratio of acrylamide formed from 2% to 98% bw acrylamide composition and dimethyl-amino ethyl/or propyl methacrylate or acrylate having a quaternary ammonium group with methyl chloride or methyl sulfate substitute thereon. Various other acrylamide copolymers useful by this invention are described in the following U.S. Pat. Nos.: 2,884,057; 2,923,701; 3,023,162; 3,689,468; 3,901,857; 3,920,599; 3,947,396; 4,011,131; 4,049,606; 4,189,563; 4,053,512, are hereby incorporated by reference; poly(diallyldimethyl ammonium chloride - acrylamide) copolymers from weight ratio of acrylamide to DADMAC (50 to 90):(50 to 10), polyadmac amphotheric (co)polymers, polydadmac, polydadmac-melamine-formaldehyde alloy, melamine-formaldehyde-(co)polyacrylamide and its cationic (co)polymers, melamine-formaldehyde or glyoxal protonized or quaternized, urea-melamine-formaldehyde (co)polymers and its alloy with (co) polyacrylamide derivatives and cationic type derivatives, melamine-dicyandiamide-formaldehyde melamine-glyoxal or melamine-glyoxal-formaldehyde melamine-dicyandiamide formaldehyde-(co)polymers acrylamide and its cationic and nonionic derivatives, dicyandiamide-formaldehyde-alkylamine or polyalkylamine or dialkylamine derivatives-co-polyacylamide and its cationic and nonionic derivatives, polyvinyl latex, acrylic latex or emulsion (co)polymers, melamine-formaldehyde or polyalkyl or aryl/aldehyde or their (co)polymers blends with cationic, nonionic polyacrylamide compounds, condensation reaction from about 1.75 to about 6 moles of formaldehyde or polyalkyl/or aryl polyaldehydes may be employed for each mole of melamine, in particular, alkali metal salts of sulfurous acid which is utilized in the process is so chosen that from about 0.25 to 2.5 moles of bisulfite (—HSO3) or sulfite (—SO3) for each mole of melamine, urea-formaldehyde and urea-formaldehyde-alkylamine or polyalkylamine (co)polymers, modified urea-formaldehyde resin having incorporated water-soluble product of reaction of (1) dicyandiamide with (2) the product of reaction under acid conditions, of formaldehyde or amine selected from the class consisting of primary aromatic monoamines and secondary monoamines having at least one monovalent aromatic radical, that is at least one aryl radical, atached to the primary and secondary monoamines having at least two of its ortho and para positions unsubstituted, alkyleneamine polyalkylamine or alkylamine-dicyandiamide condensated with epichlorohydrin or its (co)-polymers with polyacrylamide derivative cationic or nonionic compounds, terpolymers or polymers of diallyldimethyl/or diethylammonium chloride with N-vinyl-2-pyrolidone (co)polyacrylamide-(co)polymers as anionic, nononic and cationic types, rosin soap products. The acrylamide copolymer may have a molecular weight within the range form 1000 to 1 million in a liquid form and 2 million or 10 million or 15 million up to 25 million in a powder form. The molecular weight can be achieved by any one of a number of different known techniques such as intrisec viscosity, light scattering and gel permeation chromatography (GPC) and the like, as outline in "Principal" of Polymer Chemistry, P. J. Flory, Cornell University Press, 1953, pages 256–316 and J. Polymer Science Vol. 5, pages 745–7 (1950).

It must be mentioned that the glyoxal solution has a glyoxal (CHO—CHO) content which varies between 65 and 85% by weight, and the remaining portion is glyoxal hydrate, having the formula;

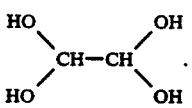

Certain complicated competitive reactions take place, but not to be ignored is the competitive reaction of glyoxal and glyoxal hydrate, formaldehyde with melamine under acid conditions. The water soluble melamine resin contains the following macromolecule, represented at the end of the reaction by the formula:

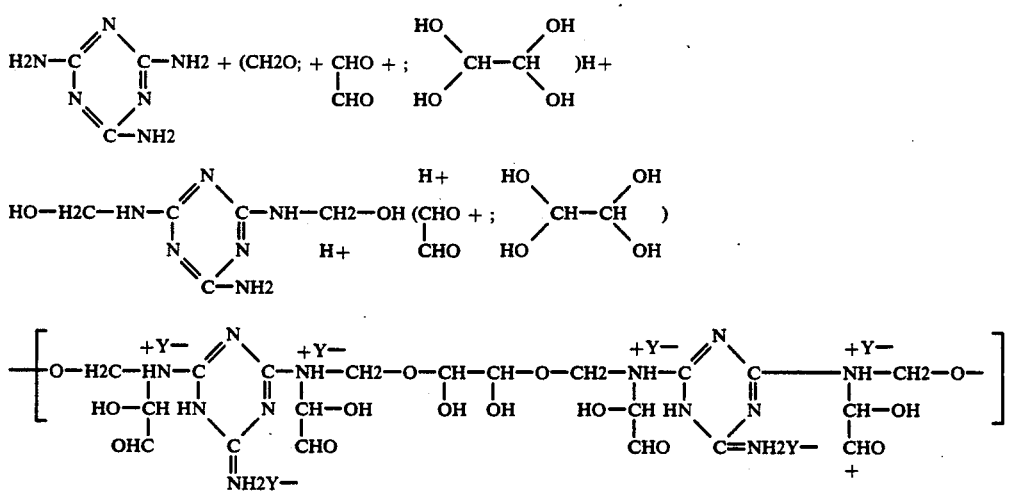

where Y— is the acid radical anion inorganic and/or organic such as: Cl—, $H_2PO_4$—, $\frac{1}{2}SO_4$—2, $HCO_2$—, $CH_3COO$—, $NO_3$—, lactic, propionic, butyric and glycolic In such acidic reaction conditions, the protonization triazinic ring and izomerization reaction is also possible.

The inorganic-organic alloy polymers and the organic alloy (co)polymers may be produced by the reaction from room temperature (RT) to 175° C. at normal pressure from 0.2 to 25 kg/cm² of A, B+, D+.

Coagulation performance is determined by the turbidity test described in ASTM D 2035-68.

The invented products, processes and their application along with relevant data are presented below. It will be understood that these examples are not intended to limit the invention, but as examples of the operation of the invention.

EXAMPLE NO. 1

A 2000 ml resin kettle flask was equipped with condenser, a mechanical stirrer, a thermometer and an additional funnel. To the flask was charged 350 g of polyhydroxyaluminum magnesium sulfate, and under moderate agitation was heated to 50°-60° when 8.75 g of powdered (pwd) or 2.5% bw of quaternized polyacrylamide (co)polymer with very high molecular weight (5 million) and 50% cationic charge was added.

The composition was mixed for 15 minutes, then 15 g of propylene/or ethylene glycol was added, and then heated to 90°-110° C. where the reaction was continued for 2 to 4 hours. After 1 hour of reaction an additional 10 g of propylene/or ethylene glycol was added. After 2 hours of reaction, the adduct alloy polymer was cooled down to 40° to 50° C. and drawn off. The resulting product had:

pH=2.56

Specific Gravity=1.308 g/cc

Viscosity=2250 cps (sp. #4 and 60 rpm)

EXAMPLE NO. 2

The reactor of Example No. 1 is charged with 350 g of polyhydroxy aluminum magnesium sulfate and heated to 65° when 7.0 g (pwd) or 2% bw of polyacrylamide (co)polymer (high cationic charged and 8 million molecular weight) is slowly dispersed. After 5 minutes mixing, the reactor is heated to 90°-100° C. and continues mixing for 30 to 180 minutes. The product is cooled down to 30°-35° C., and drawn off. It will be a transparent to semi transparent adduct alloy polymer, having:

pH=2.28

Sp. Gravity=1.327 g/ml

Viscosity=1200 cps (spd. #4, 60 rpm)

To the 200 g. of the product is added 1% bw of very fine powder activated carbon and mixed well for 30 minutes. The product, Example 2A, has:

pH=2.42

Sp. Gravity=1.288 g/ml

Viscosity=1050 cps

EXAMPLE NO. 3

The conditions of Example Number 2 are repeated by charging the reactor with 350 g of aluminum sulfate (8.2% $Al_2O_3$) and under moderate agitation is heated to 50°-60° C., when 7.0 g of (co)polyacrylamide (pwd) quaternized with very high molecular weight is added. After 10 minutes of mixing the composition is heated to 90°-110° C. and reacted for 2-4 hours and then cooled down to 40°- 45° C. 12.05g of a surfactant mixture of sodium laurylsulfate (2.2% b.w.), phosphated polyether alcohol (12.2% b.w.) and dodecylbenzene sulfonic acid (12.2%) is added to the reactor in the weight ratio of inorganic alloy to surfactant of 29.05:1.00. By agitation the product is cooled down to room temperature (RT), and drawn off. A semi-transparent adduct alloy polymer is formed, having:

pH=2.72

Sp. Gravity=1.232 g/ml

Viscosity=700 cps (spd. #4, at 60 rpm)

EXAMPLE NO. 3A

To the reactor described in Example 1 is charged 369.6 gms of polyhydroxyaluminum chloride (PAC)*** followed by 145 gms of an aluminum complex having isomeromorphism, Al/Cl(1.98:1.00), and 672 gms of ionized water. After 10 minutes mixing at room temperature (RT), there is added 1.5 gms of (co)polymer acrylamide-methacrylate quaternized with cationic charge with a molecular weight (MW) from 1.0 million to 15 million, preferably 5 million. The agitation is continued for 120 minutes when a clear to slightly blue tinted collodial adduct solution is formed having the following properties:

pH=3.66 (function of PAC used may vary from 2.5 to 4.3)

Sp. Gravity=1.19 g/ml (regular can vary from 1.15 to 1.25 g/ml)

Viscosity=50 cps (regular can vary from 30 to 500 cps on spindle no. 4 at 60 RPM, function of MW of of cationic charge of copolymer used)

***See U.S. Pat. No. 4,566,986 to Waldmann. Complex adduct of Example 3A of $90_p$ to $95_p$ with melamine glyoxal ($5_p$ to $10_p$ b.w.) quaternized which methyl sulfate or chloride protonized with can be formed by mixing from 15 to 30 minutes.

EXAMPLE NO. 4

The conditions of Example 3 are repeated by substituting the surfactant mixture with 10% by weight of long chain alcohol ethoxylate $(EO)_{1-5}$ sulfonated which is added to the reactor under agitation. The weight ratio inorganic alloy to surfactant is 13.34:1.0. A semi-transparent alloy polymer is formed with:

pH=3.35

Sp. Gravity=1.202 g/ml

Viscosity=350 cps (spd. #4 at 60 rpm)

EXAMPLE NO. 5A

The reactor described in Example No. 1 is charged with 350 g of polyhydroxyaluminumagnesium sulfate and heated to 50°-60° C. when 8.75 g of polyacrylamide (nonionic with 18 MM molecular weight) pwd. wetted with 58.33 g of dimethyl sulfoxide (DMSO) is added. The composition is continuously mixed for 80 minutes at 90°-95° C., 40g. of deonized H2O and 38 g of sodium lauryl sulfate in isopropanol-water mixture is added to the reactor at 90°-95° C. The reaction is continued for an additional 120 minutes. The product is cooled to 48°-50° C. and drawn off as semi opaque adduct alloy polymer, having:

pH=2.96

Sp. Gravity=1.260 g/ml

Viscosity=2950 cps

EXAMPLE NO. 5B 150 g of product of 5A is mixed with 1% activated carbon for 30 minutes to form inorganic activated carbon alloy mixture 5B, having:

pH=2.80

Sp. Gravity=1.240 g/ml

Viscosity=2900 cps

EXAMPLE NO. 5C

To the reactor in Example 1 is charged 800 g of polydiallyldimethylammonium chloride-acrylamide copolymer in a 50:50 copolymer ratio. Under agitation and room temperature or heat of 70° C. the (co)polymer is titrated with 200 g of aluminum chloride of which 10% b.w. is added in less than 10 minutes. The temperature is reduced to 50°-60° C., and the rest of the aluminum chloride is titrated. The reaction is continued for 60 minutes at room temperature or 50°-60° C. if lower viscosity is desired. A white water transparent inorganic-organic product is formed, having 10% concentration alloy polymer for pH measurement.

10% pH at room temperature=3.25 pH at 50°-60° C.=2.25

Sp. Gravity at room temperature=1.10 gm/cc

Sp. Gravity at 50°-60° C.=1.235 gm/cc

Viscosity at room temperature=5,800 cps. at 60 RPM

Viscosity at 50°-60° C.=550 cps. at 60 RPM

EXAMPLE NO. 6

To the reaction described in Example No. 1 is charged:

| | | |
|---|---|---|
| 1. 40% Glyoxal | 50.25 g | 0.346 Mole |
| 2. Dionized (di) water | 296.75 g | 16.486 Mole |
| 3. Melamine | 43.75 g | 0.347 Mole |
| 4. Formic Acid | 79.5 g | 1.209 Mole |
| 5. 37% Hydrochloric Acid | 18.75 g | 0.190 Mole | and heated from room temperature to 70°-86° C. in 90 minutes as follows:

a) Room temperature to 70° C. in 20 minutes
b) Hold at 70° C. to 85° C. for 60 minutes
c) Cool from 70° C.-85° C. to room temperature in 20-30 minutes. A cationic resin called (MGH) is obtained, having:

pH=2.12 to 2.25

Sp. Gravity=1.075 to 1.100 g/ml solids=20% to 25%

EXAMPLE NO. 6A

To the reactor described in Example No 6 is charged 826.5 g of the inorganic-organic alloy polymer described in Example No. 2. Under agitation, for 10 to 12 minutes, is added 174.6 g of the melamine resin (MGH) described in Example No. 6 After 15 minutes of mixing, a semi-transparent, complex adduct is formed, having:

pH=1.85

Sp. Gravity=1.246 g/ml

Viscosity=500 cps

EXAMPLE NO. 7

To the reactor described in Example No. 6 is charged:

| 1. 40% Glyoxal | 36.23 g | 0.249 Mole |
|---|---|---|
| 2. di Water | 296.76 g | 16.486 Mole |
| 3. Melamine | 31.50 g | 0.250 Mole |
| 4. 37% Formaldehyde | 81.2 g | 1.00 Mole |
| 5. Sulfuric acid (98%) | 19.50 g | 0.200 Mole |

After any required pH adjustment, the mixture is heated from room temperature to 70°–85° C. for 12 minutes, then cooled to 50° C. when 261 g of dionized or distilled water is added. The product is filtered off from any undissolved residue and drawn off as a cationic resin (called MGS), having:

pH=0.90

Sp. Gravity: 1.078 g/ml

Solids: 17% b.w.

EXAMPLE NO. 7A

To the 666.7 g of ferric sulfate hydrate aqueous solution under agitation is added 333.3 g of the resin described in Example No. 7. After mixing about 20 minutes, a light brown inorganic-organic adduct complex polymer is formed (called GFMS-Example No. 7A), having:

pH=1.50

Sp. Gravity: 1.352 g/ml (low viscosity)

EXAMPLE NO. 7B

To the 320 g of aluminum sulfate aqueous solution under agitation is added 80.0 grams of the resin described in Example No. 7. After mixing about 20 minutes a light yellow inorganic-organic adduct complex polymer is formed (called GFMS-Example No. 7B), having:

pH=1.50

Sp. Gravity: 1.2540 g/ml

EXAMPLE NO. 8

The conditions of Example No. 7 are repeated by substituting the sulfuric acid with a mixture of 9.75 g of 37.5% HCl (0.098 Mole) and 9.75 g of 98% $H_2SO_4$ (0.097 Mole). After 30 minutes of reaction, a tint blue colloidal cationic resin (called MGHCS) is formed and 0.1% b.w. of bis-guanidine carbonate is added. The product is cooled down and drawn off, having:

pH=1.32

Sp. Gravity=1.072 g/ml

Solids=14% b.w.

EXAMPLE NO. 9

The conditions of Example No. 7 are repeated by substituting the sulfuric acid with 46.12 g (0.401 Mole) of 85% phosphoric acid. After 60 minutes reaction time, a colloidal tint yellow blue resin is formed (called MGHP) with:

pH=2.73

Sp. Gravity=1.080 g/ml

Solids=18% bw

EXAMPLE NO. 9A

To the 341.20 g of melamine resin (MGHP) of Example No. 9 is added 658.80 g of 3% aqueous (co)polyacrylamide medium cationic charged and having 9 million molecular weight. After 20 minutes mixing, a tint blue organic-adduct complex alloy is formed with:

pH=2.68

Sp. Gravity=1.027 g/ml

Viscosity=375 cps

EXAMPLE NO. 9B 333.3 g of melamine resin (MGHP) described in Example No. 9 is reacted with 40% aqueous ferric sulfate (deep dark brown color). After 15 minutes reaction an inorganic-organic adduct complex polymer is formed having light brownish to chocolate creamy color with:

pH=1.65

Sp. Gravity=1.340 g/ml

Viscosity=less than 15 cps

EXAMPLE NO. 10

For more detail of compositions, see U.S. patent application Ser. Nos. 749,343 and 842,515.

A 3000 ml. pressure kettle glass reactor equipped with cooling system, temperature control and mechanical agitation, is charged with:

| 1. 37% Formaldehyde | 161.02 g | 1.983 Moles |
|---|---|---|
| 2. di Water | 36.19 g | 2.011 Moles |
| 3. Dicyandiamide | 84.42 g | 1.005 Moles |
| 4. Ammonium chloride | 53.49 g | 1.00 Moles |

5. The reactor is charged with formaldehyde and ice water. Mix for 15 to 20 minutes.

6. Charge the Dicyandiamide. The reation is endothermic. Mix for 15 to 20 minutes.

7. Charge the ammonium chloride in about 5 minutes. The reaction is still endothermic, the temperature dropping to about 8° C.

8. Close the reactor.

9. Let the exotherm go no higher than 70°–80° C. In about 20–30 minutes the temperature rose to 30° C. and pressure was 0.2 Kg/cm².

10. The exotherm rose to 62° C. in another 30 minutes and the pressure was 1.2 Kg/cm².

11. Start cooling the reactor and hold the exotherm not higher than 75° C.

12. The temperature of 73° C. was reached in about 30 minutes and pressure was 24.74 Kg/cm².

13. Hold the reaction at less than 75° C. for 40 minutes.

14. Release the pressure at 0.35 Kg/cm² and close the valve.

15. Heat slowly to 80°-85° C. and hold the reaction for 120 minutes. The pressure went as high as 1.2 Kg/cm².

16. Cool to 25°-30° C.

17. Release the pressure and draw off the product with:

pH=3.0

Sp. Gravity=1.200 g/ml

Viscosity=130 cps

Solids=53% b.w.

Appearance=water color

The product was stable more than one year. The sample product diluted to 50% solids and 100 cps viscosity was stable over 1.5 years.

EXAMPLE NO. 10A

During a 10 minute period of time, to the 934.4 g of the product (Example No. 10) is added 56.6 g of the product of Example No. 6 (MGH). Agitation is continued for 25 minutes when deep blue organic adduct-polymer complex (called Example No. 10A) is formed with:

pH=4.42

Sp. Gravity=1.155 g/ml

Viscosity=125 cps

EXAMPLE NO. 11

To the reactor described in Example No. 1 is charged:

| a) | Cyanoguanidine | 2.16 Moles |
| b) | Melamine | 0.249 Moles |
| c) | Formaldehyde (37%) | 7.365 Moles |
| d) | Methanol | 1.620 Moles |
| e) | Formic Acid (conc) | 0.651 Moles | and heated slowly to 85°-90° C. and refluxed at 88°-90° C. for 60 minutes. 1.80 Moles of urea is added and refluxed at 85°-90° C. for 12 minutes, then cooled to 40°-45° C., 3.57 Moles of methanol is added, and the product cooled to room temperature, forming a resin of light tint blue, with:

pH=6.30

Sp. Gravity=1.146 g/ml

Viscosity=70 cps

Solids=43%

EXAMPLE NO. 11A 91.6 g of resin Example No. 11 is reacted in 20 minutes with 908.40 g of melamine resin (MGHP) of Example No. 9 to form deep blue colloidal organic-adduct complex polymer called Example No. 11A, having:

pH=2.34

Sp. Gravity=1.087 g/ml

Viscosity=less than 30 cps

EXAMPLE NO. 12

To the reactor described in Example No. 11 is charged:

| a) | 40% Glyoxal | 87.43 g | 0.603 Moles |
| b) | 37% Formaldehyde | 164.13 g | 2.020 Moles |
| c) | Melamine | 76.13 g | 0.604 Moles |
| d) | 37% HCl | 32.63 g | 0.331 Moles |
| e) | di Water | 516.00 g | 28.685 Moles | after any pH adjustment, the reagents are heated for 36 minutes to 70° C., then held for 50 minutes at 70°-80° C. when tint blue colloidal resin polymeric is formed. The reactor is cooled down to 55° C. in 10 minutes (or less) and 454 (21.950 Moles) of di water is added and the product (called MGHC), is drawn off having:

pH=3.56

Sp. Gravity=1 042 g/ml

Solids=8% b.w.

EXAMPLE NO. 12A

To the 786.9 g of the product of Example No. 10 is added 57.3 g of the product MGHC, and then agitation is continued for 30 minutes when the guanidine organic-adduct complex polymeric product is formed (called GFMCG) with a blue transparent color, having:

pH=4.42

Sp. Gravity=1.155 g/ml

The product can be diluted with di-water, preferable up to 15.57% without any precipitation or separation. The product is called Example No.12A.

EXAMPLE NO. 12B

To the 136.48 g of the product Example No. 12 is added 263.52 g (co)polyacrylamide medium cationic charged, having 8 million molecular weight. After 30 minutes of the reaction, an organic adduct complex polymer is formed (called GFMCPAM Example No. 12B), having:

pH=3.34

Viscosity=1500 cps

Appearance: yellow tint color

Suggestion of Hydrophobe Alkaline Agents manufacture:

EXAMPLE NO. 13

To the reactor described in Example No. 1, or a closed mechanical chemical resistant mixer, is charged:

| | | |
|---|---|---|
| 1. Sodium hydroxide (30–35% b.w.) | 81.43% b.w. | |
| 2. Anionic surfactant (like a long chain C 12 alkyl sulfated sodium salt) | 7.14% b.w. | |
| 3. (co)polystyrene latex | 11.43% b.w. | |

The reagents are mixed well for 15–30 minutes or until a uniform product is formed. The semi to creamy white product is drawn off, having:

pH ≧ 11.5

Sp. Gravity = 1.283 g/ml

EXAMPLE NO. 14

Example No. 13 is repeated by using:

| | | |
|---|---|---|
| 1. 35% sodium hydroxide | 87.06% bw | 65.5% |
| 2. Anionic Surfactant (as in Example No. 13) | 5.88% bw | 2.4% |
| 3. (co)Polystyrene acrylic latex | 9.41% bw | 9.2% |
| 4. Aprotic solvents and/or mixture of these and/or water (preferable Dimethylsulfoxide) | 17.65% bw | 22.9% | and mixed very well for 30 minutes when white fluid latex is drawn off with:

pH ≧ over 11.5

Sp. Gravity = 1.269 g/mL

EXAMPLE NO. 15

Example No. 14 is repeated by substituting the surfactant with anionic type such as alkyl aryl sulfonate sodium salt like dodecyl phenoxy benzene disulfonate sodium salt. The composition is mixed very well for 30 minutes when the fluid chocolate creamy product is drawn off with:

pH = ≧ 11.5

Sp. Gravity = 1.277 g/ml

EXAMPLE NO. 16

The conditions of Example No. 15 are repeated by substituting the dimethyl sulfoxide with an alkaline organic striper based on aprotic solvent mixture like N-methyl pyrrolidone and high boiling point solvent, etc. (See U.S. patent application No. 42,209, Example No. 5, or U.S. Pat. No. 4,120,810, Example No. 1. After 40 minutes of mixing, a creamy fluid product is drawn off with:

pH ≧ 10

Sp. Gravity = 1.267 g/ml

EXAMPLE NO. 17

To the equipment described in Example No. 13 is charged:

| | |
|---|---|
| 1. Water | 54.35% b.w. |
| 2. Sodium gluconate | 0.694% b.w. |
| 3. KOH | 17.19% b.w. |
| 4. Alkyl glucoside ethoxylate (surfactant) | 0.694% b.w. |
| 5. Aluminate (salt and/or polymeric) | 26.54% b.w. |
| 6. Silicon (defoamer) | 0.514 b.w. |

The composition is mixed for 15 minutes when a light brown color product is formed and drawn off, having:

pH ≧ 10.00

Sp. Gravity = 1.295 g/ml

Solids = 50%

EXAMPLE NO. 17A

To the 267 grams of Example No. 17 is added over a 10 minute period, 27 grams of (co)polystyrene-acrylic latex and mixing is continued for an additional 15 minutes or until uniform emulsion is formed. The product is drawn off, having:

pH ≧ 10.50

Sp. Gravity = 1.313 g/ml

Solids = 56% b.w.

EXAMPLE NO. 18

To the equipment described in Example No. 13 is charged:

| | |
|---|---|
| 1. Water | 73.0% b.w. |
| 2. Sodium hydroxide (30% b.w.) | 4% b.w. |
| 3. Sodium metasilicate × 5H$_2$O | 1% b.w. |
| 4. Trisodiumsilicate | 0.2% b.w. |
| 5. Sodium rosinate (soap) | 2.0% b.w. |
| 6. (Co)polystyrene-acrylic latex | 20.60% b.w. |
| 7. Silicon (defoamer) | 0.2% b.w. |

The composition is mixed for 15 minutes when a light chocolate brown color product is formed and drawn off having:

pH ≧ 10.50

Sp. Gravity = 1.020 g/ml

Solids = 17%

To further exemplify and demonstrate the improved characteristics of the new flocculating material of this invention, numerous tests were conducted. These tests and their results are illustrated in the Table below. Water used to wash the air in paint or lacquer spray in order to remove over-sprayed paint or spray booth lacquer is treated with the following detackifier compositions in acidic or alkaline media and conditions:

| Product used (mls) | Water (mls) | Paint (mls) | Alkaline source | Flocculating agent (type, mls) | Detacki floation grade | Water clarity (Gardner Scale) | Observation |
|---|---|---|---|---|---|---|---|
| Example 46* (4.2) | 200 | 3(CCP) | Example 13 (2) | Example 6A (Comp. 0.8) | 1(K) | 0 | F.D.R. |
| Example 9A (4.5) MAXICHEM-1DTH 7% b.w. (3.4) | 200 | 3(CCP) | Example 14 (2) | MAXIFLOC-8503(C) 1% b.w. (3) | 1(K) | 0 | F.D.R. |
| Example 6A (2.7) Maxichem-1DTH (10) or -964 | 200 | 3(CCP) | Example 15 (2) | Maxifloc-8503 (C) 1% b.w. (9.0) | 1(K) | 0 | F to V.F.D.R. |
| Example 6A (2.7) Maxichem-957* (10) | 200 | 3(CCP) | Example 15 (2) | Example 2A (C); (0.5) | 1(K) | 0 | F.D.R. |
| Magnifloc-509C (8) | 200 | 3(CCP) | Sodium silicate/ sodium metasilicate (1:1) saturate solution (12) | Maxifloc-8503 (C) 1% b.w. (5) | 97-98% (K) | 0 to 1 | S.D.R. |
| Example 6A (2) | 200 | 3(CCP) | Example 15 (2) | Example 2A (C) (2) | 1(K) | 0 | V.F.D.R. |
| Example 9 (2) Example 9B (2) | 200 | 3(CC) | Example 15 (2) | Percol-1011(A) 1% b.w. (5) | 1(K) | 0 | V.F.D.R. |
| Example 11B (4.8) Maxichem-1DTH (2.8) | 200 | 3(CC) | Example 16 (2) | Maxifloc-8503 (C) 1% b.w. (8) | 1(K) | 0 | F.D.R. |
| Example 1 (3) | 200 | 3(CC) | Maxifloc-8010 (sodium - aluminate; 1.9) | Maxifloc-8503 (C) 3% b.w. (1) | 1(K) | 0 | F.D.R. |
| Example 9 (9) | 200 | 3(CCP) | 2% Sodium na- sinate sili- cate mixture (10) | Maxifloc-8503 (C) 1% b.w. (10) | 1(K) | 0 | H to F.D.R. |
| Example 6B | 200 | 2(CC) | Example 18 | Maxifloc-8053 | 1(K) | 0 | V.F.D.R. |
| Example 7A (2) | 200 | 2(CC) | Example 17 (2) | Example 12A (2) | 1(K) | 0 | F.D.R. |
| Example 7B (2) | 200 | 2(CC) | Example 13 | Example 12B (0.3) | 1(K) | 0 | F.D.R. |
| Example 9A (0.4) | 200 | 2(CC) | Maxichem-722W (5) | Maxifloc-8053 (0.8) | 1(K) | 0 | V.F.D.R. |
| Alum-liquid 48% (2) | 200 | 2(CC) | 20% b.w. $Na_2CO_3$ (10) | Percol-1011(A) 1% b.w. (6) Maxifloc-8503(C) 1% b.w. (1) | 2(70-75% K) | 0 to 1 | H to F.D.R. |
| Ferric Sulfate hydrate (2) | 200 | 2(CC) | 20% b.w. $Na_2CO_3$ (8) | Percol-1011(A) 1% b.w. (1) Maxifloc-8503(C) 1% b.w. (0.5) | 2(75-80% K) | 2 | H.D.R. |
| ChlorhydrolTh-50 (Polyaluminum chloride; 2 mls) | 200 | 2(CC) | 20% b.w. $Na_2CO_3$ (1.9) | Percol-1011(A) Maxifloc-8503(C) 1% b.w. (3), (2) | 2(85-90% K) | 0 to 1 | S.D.R. |
| Example 7A (GFHS; 2) Example 12 (GFHCG; 2) | 200 | 2(CC) | Example 14 (2) | Maxifloc-8503(C) 3% b.w. (0.5) | 1(K) | 0 | F to V.F.D.R. |
| Example 2** (3) | 200 | 3(CCP) | 20% b.w. $Na_2CO_3$ to pH 10 | Percol-1011(A) 1% b.w. (3) | 2(95-99% K) | 0 to 1 | M.D.R. alkaline water and sludge; by zinc present not disposable |
| Example 3A (3) | 200 | 3(CCP) | Maxifloc 8010 | Maxifloc 8503(C) 3% by wt. (1)/ov Maxifloc 8562 A 0.5% by wt. (1) | 1(K) | 0 | F.D.R. low sludge volume |
| Example 3A MGMS (1 to 1)(3) mixture | 200 | 3(CCP) | Ex. 17 | Maxifloc 8562(A) 0.5% by wt. (2) | 1(K) | 0 | V.F.D.R. low sludge |
| Example 3A MGMS (1:1)(3) mixture | 200 | 3(CCP) | 30% NOH | Maxifloc 8503 3% by wt. (1.5) | 1(K) | 0 | V.F.D.R. medium sludge volume |
| Example 2(2) | 200 | 3(CCP) | Maxifloc 8010(0.5) | Maxifloc 8503(c) 3% b.w. (1) | 1(K) | 0 | V.F.D.R. low sludge |

WATER IS TREATED WITH PRODUCTS FROM pH 6.0 TO 9.0: FILTER THROUGH LARGE POROSITY PAPER

-continued

WATER IS TREATED WITH PRODUCTS FROM pH 6.0 TO 9.0: FILTER THROUGH LARGE POROSITY PAPER

| Product used (mls) | Water (mls) | Paint (mls) | Alkaline source | Flocculating agent (type, mls) | Detacki floation grade | Water clarity (Gardner Scale) | Observation volume |
|---|---|---|---|---|---|---|---|

"MAXIFLOC" and "MAXICHEM" are Trademarks of MAXICHEM INC. "MAGNIFLOC" is a Trademark of American Cyanamid Co. "PERCOL" is a Trademark of Allied Colloids Inc. of USA
OBSERVATIONS:
*See U.S. Pat. Application No. 842,515 (March 21, 1986)
**Nalco Chemical Co. U.S. Pat. No. 4,067,806
MAGNIFLOC is a trademark of American Cyanamid Co.
MAXIFLOC is a trademark of Maxichem Inc.
PERCOL is a trademark - Allied Colloids Inc.
M.D.R. = Medium dewatering rate
S.D.R. = Slow dewatering rate
F to VF = Fast to very fast dewatering rate
K = Pain killed
MAXICHEM-1DTM = Polymelamine formaldehyde condensate
MAXICHEM-957 = modified polymelamine condensate (glyoxal type)
MAXICHEM-964 = polymelamine formaldehyde condensate protonized
MAGNAFLOC-509C = Polymelamine formaldehyde condensate;
(C) = Cationic type
(A) = Anionic type
(N) = Nonionic type
Detackification grades are arbitrarily defined as: 1. Very good (killed); 2. Good; 3. Fair; 4. Poor 5. Unacceptable
The water supernatant is expressed in Garner Color Scale and is:
0 — water color (clear)
1 — white
2 — slight yellow
3 — yellow
4 — brownish yellow
5 — brown
6 — dark brown
7 — dark, blackish color Although the invention has been described with respect to preferred embodiments, it is not to be so limited since various alternatiions, changes, deviations, modifications and departures may be made by those skilled in the art to the embodiments shown, and are within the spirit and intended scope of the present invention.

I claim:

1. A composition for detackifying and coagulating paint or lacquer in a spray booth bath wherein the water bath traps excess plant and lacquer from a painting process, said composition made by adding to said water in acid or alkaline media sufficient amount of a water soluble product comprising:

an inorganic-organic adduct alloy polymer composition having the formula

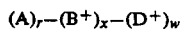

wherein:

A is an inorganic material represented by the formula:

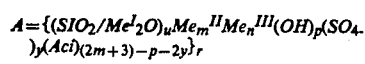

where:

u is 0 to 10% by weight, r is 1 to 99% by weight $(SiO_2/Me_2^IO)_u$ ratio is 1.5 to 3.5 and $Me^I$=Na, K, Li, $(SiO_2/Me_2^IO)_u$ is a silicate adduct or polymeric form of a compound selected from the group of hydroxy, polyhydroxy and oxy aluminum compound;

$Me_m^{II}$ is selected from the divalent cation group of hydroxy, polyhydroxy aluminum and iron adduct complex consisting of:

Mg, Zn, Ca, and $Fe^{II}$; and m=0 to 5;

$Me_n^{III}$ is a tri-or higher valent metal selected from the group consisting of the adduct of hydroxy, polyhydroxy, and oxy of Al, Fe, and Al-Zr complexes; and n=1 to 20;

Aci is selected from the monovalent anionic group consisting of: I—, Cl—, Br—, $NO_3^-$, $H_2PO_4^-$, $CH_3COO^-$, $OH^-$, and mixtures thereof;

p=0 to 75; y=0 to 15; $-(B^+)_x$ is a water soluble cationic polymer selected from the group consisting of protonized or quaternized polymers of melamine-glyoxal, melamine-formaldehyde, melamine-glyoxal-formaldehyde and its copolymer with cyanoguanidine, urea, cationic polyamine selected from the group of epichlorohydrin-dimethylamine polymers or copolymers thereof, ($C_1$-$C_3$) alkanol amine protonized by mineral acids or organic acids selected from the group consisting of hydrochloric, sulfuric, phosphoric, nitric, formic, acetic, propionic, glycolic, lactic, citric, glutaric, oxalic and mixtures thereof, and optionally quaternized with a compound selected from the group consisting of methyl halides and $C_1$-$C_2$ dialkyl sulfates, said polymer having a viscosity average molecular weight of from 200 to 500,000;

and x=0 to 100% by weight, and $-(D^+)_w$ is a water soluble cationic polymer or (co)polymer selected from the group consisting of homopolymers of cationic monomers selected from the group consisting of (meth)acrylamide, $C_1$-$C_4$ dialkylamino(meth)acrylate and their quaternized derivatives with methyl halides or $C_1$-$C_2$ dialkyl sulfates, salts of dialkylamino-(meth)acrylate with acids selected from the group of sulfuric, hydrochloric and phosphoric acids, methacrylamidopropyl trimethyl ammonium salt, N,N,N-trimethylallyl ammonium salts, diallyldimethyl ammonium halide, and copolymers thereof, amphoteric polymers selected from the group consisting of poly(-DADMAC), (co)polymers of (DADMAC-acrylamide) in weight ratio of (50/50), and mixtures thereof, acrylamide-manich (co)polymers, nonionic, anionic and cationic (co)polyacrylamide, blends of cationic (co)polyacrylamide and poly(-DADMAC) with water soluble protonized and optionally quaternized polymers of melamine-glyoxal, melamine-formaldehyde, melamine-glyoxal-formaldehyde and (co)polymers with cyanoguanidine, urea, cationic polyamine selected from the group of epichlorohydrin-dimethylamine polymers or copolymers thereof, $C_1$–$C_3$ alkanol amine, and mixtures thereof, and w=0.2 to 99% by weight with the proviso that A is always positive and at least one of B+ and/or D+ is also positive.

2. A composition according to claim 1 wherein A is selected from the group consisting of:

$Al_n(OH)_m X_{3n-m-2k}(SO_4)_k$; $Al_n(OH)_m(SO_4)_k$; and $Me_n(OH)_m X_{3n-m}$;

wherein: k,n,m are positive integers

3. A composition according to claim 1 wherein A is 5% to 98% by weight, and is selected from the group consisting of: polyhydroxyaluminum magnesium chloride, polyhydroxyaluminum magnesium sulfate, hydroxyaluminum sulfate, polyaluminum sulfate, oxyaluminum sulfate or oxyaluminumsilicosulfate, polyhydroxyaluminum chloride, polyhydroxyaluminumzincoxidechloride, polyhydroxyaluminum magnesiumchlorosulfate, polyaluminumferric chloride, polyaluminumferrouschlorosulfate, hydroxyaluminumchloride, polyhydroxyaluminum chloridesilicate or sulfatosilicate, polyhydroxyaluminumcalciumchloride, aluminumzirconium tetra chlorohydrate, aluminum chloride, aluminum sulfate, aluminum nitrate and mixtures thereof.

4. A composition according to claim 1 wherein B+ is present in a concentration of 2% to 98% by weight and is selected from the group consisting of water soluble cationic and quaternary polyamines selected from the group consisting of epichlorohydrin-dimethylamine polymers or copolymers thereof, polymer and (co)polymer products of melamine-aldehyde, melamine-dialdehyde, melamine-aldehyde-dialdehyde, melamine-aldehyde with $C_1$–$C_3$ alkanol amine, melamine-aldehyde-dialdehyde with $C_1$–$C_3$ alkanol amine protonized with mineral acids or organic acids selected from the group consisting of sulfuric, hydrochloric, phosphoric, nitric, formic, acetic, propionic, glycolic, lacticm citric, glutaric, oxalic and mixtures thereof wherein the aldehyde and dialdehyde are selected from the group consisting of formaldehyde, paraformaldehyde, acetaldehyde, glyoxal, benzaldehyde, butyraldehyde, furfurylaldehyde and mixtures thereof said polymers having a viscosity average molecular weight of rom 200 to 500,000.

5. A composition according to claim 4 wherein the resin is a (co)polymer comprising:

| | |
|---|---|
| melamine | 0.15 to 2.05 Moles |
| glyoxal | 0.5 to 5.0 Moles |
| mineral acids, organic acids, aryl sulfonic acids, ammonium chloride, quaternizing agents selected from the group consisting or methyl halides, $C_1$-$C_2$ dialkyl sulfate and benzyl halides | 0.33 to 5.0 Moles |
| cyanoguanidine | 0.0 to 3.33 Moles |
| aldehydes selected from the group of monoaldehydes and dialdehydes | 0.0 to 15.0 Moles |
| amines selected from the group consisting of aliphatic amine, polyamine and alkanolamines | 0.0 to 5.0 Moles |
| urea or thiourea | 0.0 to 2.05 Moles |

6. A composition according to claim 5 wherein B+ is a resin or (co)polymer selected from aqueous cationic resins consisting of: melamine-formaldehyde, melamine-formaldehyde-glyoxal, cyanoguanidine-formaldehyde, urea or thiourea-formaldehyde, urea or thiourea-glyoxal, melamine-cyanoguanidine-formaldehyde, protonized by inorganic or organic acids selected from the group consisting of hydrochloric, sulfuric, phosphoric, nitric, formic, acetic, propionic, glycolic, lactic, citric, glutaric, oxalic and mixtures thereof, and optionally quaternized with methyl halides or $C_1$-$C_2$ dialkyl sulfate agents, and water soluble cationic and quaternary polyamines selected from the group of epichlorohydrin-dimethylamine polymers or copolymers thereof.

7. A composition according to claim 1 wherein D+ is selected from a group consisting of aqueous solution of homopolymers of cationic monomers selected from the group consisting of (meth)acrylamide, $C_1$–$C_4$ dialkylamino(meth)acrylate and their quaternized derivatives with methyl halides or $C_1$-$C_2$ dialkyl sulfates, salts of dialkylamino-(meth)acrylate with acids selected from the group of sulfuric, hydrochloric and phosphoric acids, methacrylamidopropyl trimethyl ammonium salt, N,N,N-trimethylallyl ammonium salts, diallyldimthyl ammonium halide, and copolymers thereof, amphoteric polymers selected from the group consisting of poly(-DADMAC), (co)polymers of (DADMAC-acrylamide) in weight ratio of (50/50), and mixtures thereof, acrylamide-manich (co)polymers, nonionic, anionic and cationic (co)polyacrylamide, blends of cationic (co)polyacrylamide and poly(DAFMAC) with water soluble protonized and optionally quaternized polymers of melamine-glyoxal, melamine-formaldehyde, melamine-glyoxal-formaldehyde and (co)polymers with cyanoguanidine, urea, cationic polyamines selected from the group of epichlorohydrin-dimethylamine polymers or copolymers thereof, $C_1$–$C_3$ alkanol amine, and mixtures thereof.

8. A composition according to claim 1 wherein D+ is in a concentration of 2% to 98% by weight and is selected from the group consisting of polydiallylamine, poly(DADMAC), amphoteric poly(DADMAC), polyallyltrialkylammonium salt and copolymers with acrylamide, poly-N,N,N-trimethylallyl ammonium salt and (co)polymers with acrylamide, poly-N,N,N-dimethylacrylamide and copolymers with acrylamide and cationic acrylates or methacrylates, (co) polymer of acrylamide with acrylate and methacrylate monomers quaternized with a compound selected from the group consisting of methyl halide, dimethyl sulfate or diethyl sulfate, acrylate and methacrylate monomers having tertiary alkyl ammonium salt groups, poly(DADMAC)-melamine-formaldehyde,poly(DADMAC)-melamine-glyoxal,poly(DADMAC)-melamine-formaldehydeglyoxal protonized or quaternized derivatives thereof and mixtures thereof, unsaturated emulsion (co)polymers of vinyl monomers selected from the group consisting of styrene, divinyl benzene, and acrylate monomers, nonionic, cationic and anionic (co)polyacrylamide compound with the viscosity average molecular weight in the range of 20,000 to 25,000,000, and rosin soap product.

9. A composition for detackifying and coagulating paint or lacquer in a spray booth wherein the water bath traps excess paint or lacquer from painting processes, said composition made by adding to said water in acid or alkaline media sufficient amount of water soluble product comprising a water soluble organic-organic alloy of the formula:

$$(B^+)_x-(D^+)_w$$

wherein

$$-(B^+)_x$$

is a water soluble cationic polymer selected from the group consisting of cationic or quaternized polyamines selected from the group of epichlorohydrin-dimethylamine polymers or copolymers thereof, protonized or quaternized polymers of melamine-glyoxal, melamine-formaldehyde, melamine-formaldehyde-glyoxal and their (co)polymers with a compound selected from the group consisting of cyanoguanidine, urea, ($C_1$-$C_3$) alkanol amines protonized by mineral acid or organic acids selected from the group of hydrochloric, sulfuric, phosphoric, nitric, formic, acetic, propionic, glycolic, lactic, citric, glutaric, oxalic and mixtures thereof, and optionally quaternized with a compound selected from the group consisting of methyl halides and $C_1$-$C_2$ dialkyl sulfates, said polymer having a viscosity average molecular weight of from 200 to 500,000 x=1 to 99% by weight;

and

$$-(D^+)_w$$

is selected from a group consisting of aqueous solution of cationic polymers selected from the group consisting of acrylamide, $C_1$-$C_4$ dialkylamino(meth)acrylate and their quaternized derivatives with methyl halides or $C_1$-$C_2$ dialkyl sulfates, salts of dialkylamino-(meth)acrylate with acids selected from the group of sulfuric, hydrochloric and phosphoric acids, methacrylamidopropyl trimethyl ammonium salt, N,N,N-trimethylallyl ammonium salts, diallyldimethyl ammonium halide, and copolymers thereof, amphoteric polymers selected from the group consisting of poly(DADMAC), (co)polymers of (DADMAC)-acrylamide) in weight ratio of (50/50), and mixtures thereof, acrylamide-manich (co)polymers, nonionic, anionic and cationic (co)polyacrylamide, blends of cationic (co)polyacrylamide and poly(DADMAC) with water soluble protonized and optionally quaternized polymers of melamine-glyoxal, melamine-formaldehyde, melamine-glyoxal-formaldehyde and (co)polymers with cyanoguanidine, urea, cationic polyamines selected from the group of epichlorohydrin-dimethylamine polymers and copolymers thereof, $C_1$-$C_3$ alkanol amine, and mixtures thereof and w=1 to 99% by weight.

10. A composition according to claim 9 wherein $B^+$ is present in a concentration of 2% to 98% by weight and is selected from the group consisting of a composition of water soluble cationic polyamines selected from the group of epichlorohydrin-dimethylamine polymers and copolymers thereof, cationic polymer and (co)polymer product of melamine-aldehyde, melamine-dialdehyde, melamine-aldehyde-dialdehyde and adducts with amines selected from the group of epichlorohydrin-dimethylamine polymers and copolymers thereof, $C_1$-$C_3$ alkanol amine, protonized by mineral acids or organic acids selected from the group consisting of sulfuric, hydrochloric, phosphoric, nitric, formic, acetic, propionic, glycolic, lactic, citric, glutaric, oxalic, and mixtures thereof; wherein the aldehyde and dialdehyde is selected from the group consisting of formaldehyde, paraformaldehyde, glyoxal, acetaldehyde, benzaldehyde, butyraldehyde, furfurylaldehyde, and mixtures thereof and said polymer has a viscosity average molecular weight of from 200 to 500,000.

11. A composition according to claim 10 wherein $B^+$ is a resin or (co)polymer comprising:

| | |
|---|---|
| melamine | 0.15 to 2.05 Moles |
| glyoxal | 0.50 to 5.0 Moles |
| mineral acid, organic acids, aryl sulfonic acids ammonium chloride quaternizing agents selected from methyl halides, $C_1$-$C_2$ dialkyl sulfate and benzyl halides | 0.33 to 5.0 Moles |
| cyanoguanidine | 0.0 to 3.33 Moles |
| aldehyde selected from monoaldehyde and dialdehydes | 0.0 to 15.0 Moles |
| amines selected from the group consisting of aliphatic amine, polyamine, and alkanol amine | 0.0 to 5.0 Moles |
| urea or thiourea | 0.0 to 2.05 Moles |

12. A composition according to claim 11 wherein $B^+$ is a resin or (co)polymer selected from the group of aqueous cationic polyamines selected from the group of epichlorohydrin-dimethylamine polymers and copolymers thereof, cationic polymer and (co)polymers selected from the group constituting of melamine-formaldehyde, melamine-glyoxal, melamine-formaldehyde-glyoxal, cyanoguanidine-formaldehyde, urea or thiourea-formaldehyde urea, or thiourea-glyoxal, urea- or thiourea-formaldehyde-glyoxal, melamine-cyanoguanidine-formaldehyde protonized by inorganic acid or organic acids selected from the group consisting of hydrochloric, sulfuric, phosphoric, nitric, formic, acetic, propionic, glycolic, lactic, citric, glutaric and oxalic acids, and optionally quaternized with an alkylating agent selected from the group of methyl halides and $C_1$-$C_2$ dialkyl sulfates, said polymers having a viscosity average molecular weight of from 200 to 500,000.

13. A composition according to claim 9 wherein $D^+$ is selected from the group consisting of water soluble cationic polymers or (co)polymers selected from the group consisting of (meth)acrylamide, $C_1$-$C_4$ dialkylamino(meth)acrylate and their quaternized derivatives with methyl halides or $C_1$-$C_2$ dialkyl sulfates, salts of dialkylamino-(meth)acrylate with acids selected from the group of hydrochloric, sulfuric, and phosphoric acids, methacrylamidopropyl trimethyl ammonium salt, N,N,N-trimethylallyl ammonium salts, diallyldimethyl ammonium halide, and copolymers thereof, amphoteric polymers selected from the group consisting of poly(-

DADMAC), (co)polymers of (DADMAC-acrylamide) in weight ration of (50/50), and mixtures thereof, acrylamide-manich (co)polymers, nonionic, anionic and cationic (co)polyacrylamide, blends of cationic (co)polyacrylamide and poly(DADMAC) with water soluble protonized and optionally quaternized polymers of melamine-glyoxal, melamine-formaldehyde, melamine-glyoxal-formaldehyde, (co)polymers with cyanoguanidine, urea, cationic polyamine selected from the group of epichlorohydrin-dimethylamine polymers or copolymers thereof, $C_1$–$C_3$ alkanol amine, and mixtures thereof.

14. A composition according to claim 9 wherein D+ is present in a concentration of 2% to 98% by weight and is selected from the group consisting of polydiallylamine, poly(DADMAC), amphoteric poly(DADMAC), polydiallyltrialkylammonium salts, poly-N,N,N-trimethylallyl ammonium salt, poly-N,N,-dimethylacrylamide and (co)polymers with acrylamide, (co)polymers of acrylamide with monomers having quaternary ammonium group made with alkylating agents selected from the group consisting of methyl halide, and dimethyl and diethyl sulfate, (co)polymers of acrylamide having tertiary alkyl ammonium salts group, acrylamide-manich (co)polymers, poly(DADMAC)-melamine-formaldehyde, poly(DADMAC)-melamine-glyoxal, poly(DADMAC)-melamine-formaldehyde-glyoxal protonized or quaternized products thereof, cationic (co)polyacrylamide-melamine-formaldehyde, cationic (co)polyacrylamide-glyoxal protonized or quaternized derivatives thereof and mixtures thereof, latices selected from the group of styrene and acrylate latices, nonionic (co)polyacrylamide, cationic (co)polyacrylamide and anionic (co)polyacrylamide compound with a viscosity average molecular weight in the range from 20,000 to 25,000,000; and rosin soap products.

15. The composition according to claim 1 wherein A is 95 to 99.5% by weight (bw), B+ is zero and D+ is 0.5 to 5.0% by weight.

16. The composition according to claim 1 wherein A is 20 to 98% by weight, B+ is zero (0) and D+ is 2 to 80% by weight.

17. The composition according to claim 1 wherein A is 50 to 99% by weight, B+ is 1 to 50% by weight and D+ is 0.2% to 30% by weight.

18. The composition according to claim 1 wherein A is 3.0 to 95% by weight, B+ is 5 to 97% by weight.

19. The composition according to claim 15 wherein A is aluminum sulfate and D+ is a quaternized acrylamide-(meth)acrylate (co)polymer.

20. The composition according to claim 16 wherein A is aluminum chloride and D+ is a quaternized acrylamide-(DADMAC) in (50/50) weight ratio (co)polymer.

* * * * *